Nov. 25, 1958  W. A. MORGAN  2,861,452
NUCLEAR ANEMOMETER
Filed April 23, 1956
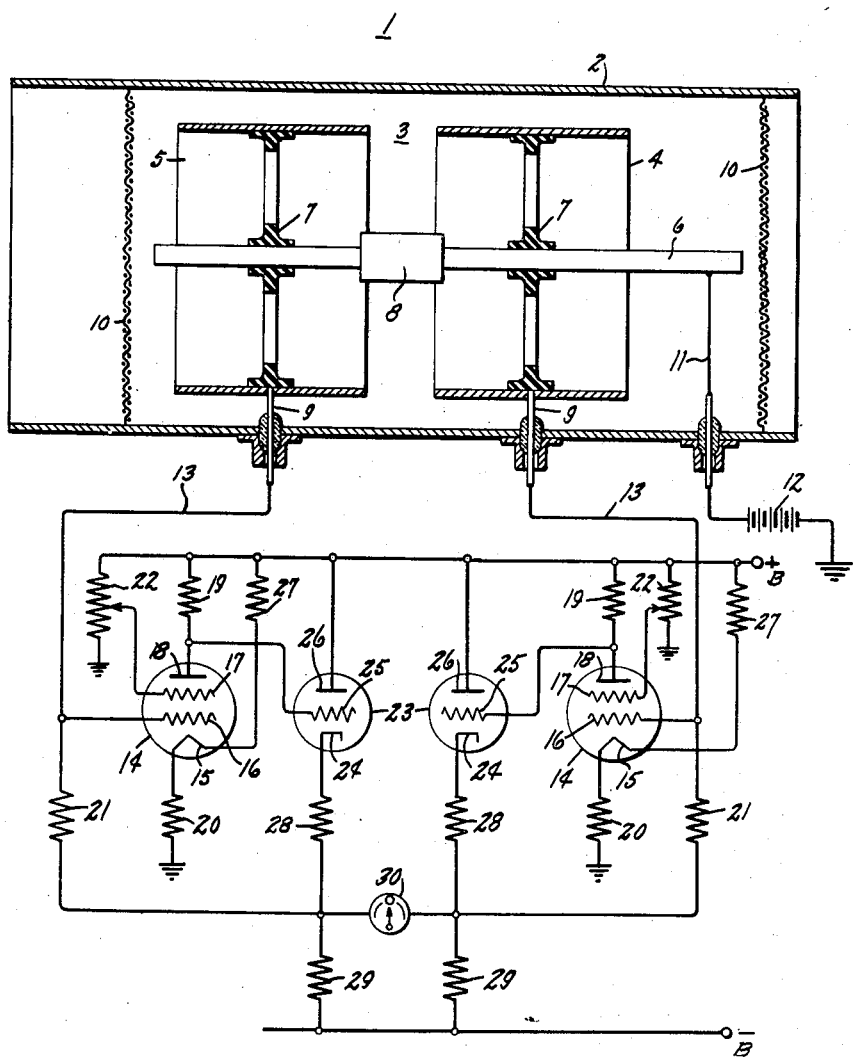
Inventor
Walter A. Morgan
by Merton D. More
His Attorney

United States Patent Office 2,861,452
Patented Nov. 25, 1958

2,861,452

NUCLEAR ANEMOMETER

Walter A. Morgan, Latham, N. Y., assignor to General Electric Company, a corporation of New York Application April 23, 1956, Serial No. 579,865

1 Claim. (Cl. 73—194)

This invention relates to a device for measuring the velocity of a flowing gas. More particularly, this invention relates to a gas velocity measuring device which utilizes a radioactive source to ionize molecules of the gas.

In the past, there have been attempts to utilize a source of radioactivity for ionizing flowing gases as a means for measuring the velocity of flow. However, these prior art devices have generally suffered from a lack of sensitivity and an inability to measure a wide dynamic range of flow.

One of these prior art devices contemplates positioning a source of radioactive material a fixed distance away from a pair of charged electrodes. Molecules of the flowing gas are ionized by the radioactive source and travel to the electrodes and discharge to produce a current flow as a measure of the velocity of the gas. With no gas flow or very low velocities, the ionized molecules recombine and lose their charge before reaching the electrodes and consequently no indication is produced. With greater velocities of gas flow, more and more ionized molecules reach the electrodes to produce a current flow therefrom, the magnitude of which is a measure of the velocity of the flowing gas.

Another prior art device consists of a pair of charged collecting electrodes positioned transversely to the direction of current flow and a source of radioactive material to produce the ionized molecules. In the absence of gas flow, substantially all of the ionized molecules are drawn to the collecting electrodes by virtue of the electric field present to produce a maximum current flow. As the velocities of flow increase, more of the ionized particles are swept out of the fields of the electrodes and are not collected thereby, consequently reducing the amount of current. Thus, the amount of current flowing in the electrodes constitutes a measure of the gas velocity.

While these prior art devices are generally satisfactory, they suffer from a number of shortcomings which severely limit their utility. That is, they have very low sensitivity and are not directionally responsive. As a consequence, their use is limited to systems where high accuracy is not of paramount importance and to systems where there is a unidirectional flow. Thus, because of the lack of directional characteristics, these systems are limited to use in metering gas fluids through conduits where the direction of flow does not change. Where the direction of flow, as well as the velocity, is a necessary item of information, as, for example, in measuring thermal currents in an oven, these prior art devices are of relatively little utility.

It is an object of this invention, therefore, to provide an apparatus for measuring the velocity of gas flow which has a very high sensitivity.

Another object of this invention is to provide an apparatus for measuring the velocity of gas flow which is also capable of indicating the direction of the gas flow.

A further object of this invention is to provide an apparatus for measuring gas flow velocities which utilizes a null balance and differential measuring system which is very sensitive to minute changes in flow velocities.

Briefly speaking, the apparatus embodying the instant invention comprises a source of radioactivity, for ionizing molecules of gas, which is positioned between two pairs of cylindrical collecting electrodes. The radioactive source ionizes some of the gas molecules within the device. Under the influence of the electric field which exists between the source and collectors, the ions drift away from the source towards the collectors. If there is no gas flow, an equal number of ions will reach both collectors and a null reading will be obtained. Gas flowing past the collecting electrodes deflects some of the ions which would normally strike the first collector and cause them to strike the second collector. The difference in the amount of current striking each collector is a function of the gas velocity. By virtue of the differential measuring system, the apparatus is extremely sensitive to small changes of gas velocity. Furthermore, by indicating which of the collecting electrodes receives the greater and the lesser number of ions, it is possible to determine the direction of the gas flow as well as its velocity.

The novel features which are characteristic of this invention are set forth with particularity in the appended claim. The invention itself, however, both as to its organization and method of operation, together with further objects and advantages thereof, may best be understood by reference to the following description taken in connection with the accompanying drawing, in which the accompanying drawing illustrates diagrammatically a preferred embodiment of this invention.

Referring now to the drawing, there is shown, broadly speaking, a transducing element which produces a current which is a measure of the velocity of a flowing gas. This transducing element includes a radioactive source for ionizing molecules of the flowing gas and two electrodes for collecting the ionized molecules to produce current flow in response thereto. The transducer output is connected to the input of a differential current measuring device to provide an indication of the velocity of the flowing gas as well as its direction.

The transducing element 1 includes a cylindrical housing 2 open at both ends and constructed of aluminum or other similar materials. Positioned within the housing 2 is an energizing and collecting device 3 consisting of a first cylindrical ion collector electrode 4 concentric with the housing 2 and a second similar cylindrical collecting electrode 5 axially adjacent to the first collecting electrode 4. A concentric metallic support rod 6 is positioned within and extends through the ion collecting electrodes 4 and 5 and constitutes therewith a first and second pair of electrodes. An insulating web 7 supports and positions the support rod 6 with respect to the collecting electrodes 4 and 5. Mounted on the metallic support rod 6 and positioned mid-way between the ion collecting electrodes 4 and 5 is a small stainless steel housing 8 which contains a source of gamma radiation such as a 5 millicurie radium pellet to provide a source of radiation for ionizing gas molecules. The gamma radiation ionizes the molecules of the gas, and these ionized molecules are collected by the two cylindrical ion collecting members 4 and 5.

Additionally, there is provided a means for establishing an electric field between the metallic support rod 6 and the cylindrical collecting members 4 and 5. The metallic support rod 6 is connected through a lead 11 extending through the housing 2 to the positive terminal of a source of energy 12. In this fashion, the rod 6 is maintained at a potential which is positive with respect to a voltage reference point such as ground. As a result, an electric field exists between the metallic support rod 6 and each of the electrodes 4 and 5 which acts upon the ionized molecules and causes them to drift toward the collector electrodes 4 and 5. The collecting electrodes 4 and 5 are maintained, as will be explained in greater detail later, at substantially ground potential in order to exert a constant radial force on the ionized molecules.

A first metallic screen 10 is positioned to the left of the ion collector 5 while a second metallic screen 10 is positioned to the right of ion collector 4. These metallic screens function to block extraneous ions formed on the upstream side of the screens from being blown onto the collector by the gas flow. Two such screens are necessary inasmuch as this device may be utilized with flowing gases whose direction of flow is either from the left or the right. A pair of rigid connecting elements 9 serve both to support the ion collecting electrodes and to provide a conductor for the current from these electrodes. The rigid connectors extend through the housing 2 and are insulated therefrom by means of non-conducting bushings. The connectors 9 are electrically connected to leads 13 which are in turn attached to the input of the differential measuring device.

During operation, gamma rays emitted by the source contained in the housing 8 ionize some of the gas molecules. Under the influence of the electric field, the ions drift towards the collecting electrodes 4 and 5. If there is no air or gas flow through the transducing element, an equal number of ions will reach both collector electrodes. Consequently, the current from each of these collector electrodes is equal and the differential measuring means will thus indicate zero or no-flow conditions. However, gas flowing through the transducer will deflect some of the ions which would normally strike collector electrode 5 (assuming gas flow from left to right) and cause them to strike collector electrode 4. Consequently, the amount of current flowing from the collector electrode 5 will be decreased while the current flowing from the collector electrode 4 will be increased. The difference in the amount of current from each collector is a function of the gas velocity. The ion currents from the two collector electrodes 4 and 5 are fed into the input of the low current differential amplifier to produce an indication of the velocity of flow as well as the direction of flow.

The measuring means of the instant apparatus comprises electronic means for producing a signal whose magnitude is proportional to the differential current flowing in the two collector electrodes and whose sense is an index of the direction of flow of the gas. An indicating means is connected to the electronic measuring means to provide an indication of the magnitude and sense of the signal. The ion currents from the two collector electrodes 4 and 5 are connected by means of leads 13 to the input of a pair of electrometer tubes 14, such as the CK5889, which are characterized by low grid current and direct filament emission. Each of these electrometer tubes 14 consists of a directly emitting filament 15, a control grid 16, a screen grid 17, and an anode member 18. The anode members 18 are connected to a source of positive supply voltage B+ through anode resistors 19 while the filaments 15 are biased with respect to a voltage reference point such as ground through resistors 20 and 27. The screen grids 17 are maintained at a positive potential somewhat less than the anodes by a variable voltage divider consisting of resistor 22 which is connected to the source of positive voltage B+ on one end and ground on the other. Ion currents from the ion collectors 4 and 5 flow through the control grid resistors 21, producing a voltage which controls the plate current of the tube 14.

The output voltage of the tubes 14 are connected to the input grids of a pair of cathode follower tubes 23. Each of the cathode follower tubes 23 consists of a cathode 24, a control grid 25, and an anode 26. The anodes 26 of each of the cathode followers is connected directly to the source of positive supply voltage B+, while the cathodes 24 are connected to a source of negative voltage B— through two series connected cathode resistors 28 and 29. Connected between the junctions of the cathode resistors 28 and 29 of each of the tubes 23 is a microammeter 30 of the zero center type, wherein the zero position of the pointer is in the middle of the scale. At zero flow, the currents on the leads 13 are of equal magnitude and, consequently, the plate current of the electrometer tubes 14 are equal. As a result, the amount of conduction by the cathode follower tubes 23, whose input is connected to the output of the electrometer tubes, is equal and the potential at the junction of the series connected resistors 28 and 29 of each of the cathode followers is equal, and no deflection of the meter 30 occurs.

As gas flow occurs, the current on one of the leads 13 increases, while the current on the other lead 13 decreases. Consequently, the current flowing through the individual electrometer tubes 14 and cathode follower tubes 23 will mirror the increase and decrease of the current on the respective leads. The potential at the junction point of the cathode resistors 28 and 29 of the individual cathode followers reflects this change in current and produces a voltage differential proportional to the difference in the ion currents flowing in the leads 13. As a consequence, the pointer of the microammeter 30 is deflected by an amount proportional to this differential current.

Furthermore, the direction of deflection of the microammeter pointer from zero gives an indication of the direction of the gas flow since it will indicate which of the ion currents, that is, from the ion current collector 4 or 5, is the larger. It is clear that the ion collector electrode nearest the direction from which the gas flows always has the lesser current inasmuch as the flowing gas blows ions away from it and toward the collector electrode furthest away. Thus, the microammeter can be calibrated directly in gas flow velocity as well as in direction.

The control grids 16 of the electrometer tubes 14 are maintained at a potential very close to ground and, consequently, tend to maintain the collector electrodes 4 and 5 at a potential very near to ground. To this end, one end of the grid resistances are connected to the individual control grids 16 while the other ends are connected to the junction points of the cathode resistors 28 and 29. As a consequence, the voltage drop across the cathode resistors 29 opposes the voltage drop across the grid resistors 21 and tend to maintain the control grids 16 and, consequently, the ion collector electrodes 4 and 5 at very near ground potential.

That is, the voltage drop across the cathode resistors 29 is in phase with the input to the cathode follower tubes 23 by virtue of the well known cathode follower action. The input to the cathode followers is 180° out of phase with the input signal to the electrometer tubes 14 by virtue of the normal tube phase inversion. Since the input to the electrometer tubes 14 is the voltage appearing across the grid resistors 21, it can be seen that the voltage drop across the cathode resistors 29 is in phase opposition thereto. By maintaining a high loop gain between the individual electrometer and cathode follower tubes, the voltage excursion at the control grid 16 of the electrometer tubes may thus be maintained very close to ground. It is desirable to maintain the voltage excursions of the grids 21 as small as possible in order to maintain the collector electrode potential substantially at ground so that the radial force exerted on the ionized molecules is maintained substantially constant.

It is also possible to further increase the sensitivity of the apparatus by differentially adjusting the screen grid voltages of the individual electrometer tubes 14. In this manner, it is possible to null out any current condition on the leads 13 representative of a given flow velocity condition, thus making this flow condition the new reference point. That is, the meter 30 will be at its zero position for a given velocity of flow, and it thus becomes possible to observe minute changes of flow velocities at relatively large flow conditions.

Although the preferred embodiment of the instant invention discloses a gamma radiation source comprising radium, it is obvious that other sources of radiation well known to those skilled in the art, such as artificial isotopes, may be utilized in place of the radium. It would only be necessary, where one of the artificial isotopes is utilized, to choose one which has a half life of sufficient length to make frequent replacement unnecessary.

While a particular embodiment of this invention has been shown, it will, of course, be understood that the in-invention is not limited thereto since many modifications in the circuit arrangement may be made. I contemplate by the appended claim to cover any such modifications as fall within the true spirit and scope of this invention.

What I claim as new and desire to secure by Letters Patent of the United States is:

In a gas flow measuring device, the combination comprising a housing, a radioactive source positioned within said housing for ionizing molecules of the flowing gas, first and second cylindrical electrodes and an electrode coaxial with said pair of cylindrical electrodes positioned within said housing, means to produce electric fields between the individual cylindrical electrodes and said coaxial electrode whereby a portion of said ionized molecules are collected on said first cylindrical electrode to produce a current flow and the remaining portion of said ionized molecules are collected on said second cylindrical electrode to produce a current flow in response thereto, measuring means comprising a first pair of electron discharge devices having their inputs individually connected to said collecting electrodes, a pair of cathode followers connected to the outputs of said discharge device, feedback means from said cathode followers to the input of said discharge device to maintain said inputs substantially at a reference potential, indicating means connected between said cathode followers to indicate the magnitude and sense of the differential current as a measure of the velocity and direction of the gas flow.

References Cited in the file of this patent

UNITED STATES PATENTS

| | | |
|---|---|---|
| 2,611,268 | Mellen | Sept. 23, 1952 |
| 2,637,207 | De Boisblanc | May 5, 1953 |

OTHER REFERENCES

Article: "An Ionization Anemometer" by Lovelock and Wasilewska, published in Journal of Scientific Instruments in Industry, vol. 26, No. 11, November 1949.